No. 617,418. Patented Jan. 10, 1899.
G. T. HANCHETT & F. B. SAGE.
ELECTRICAL MEASURING INSTRUMENT.
(Application filed May 2, 1898.)
(No Model.)

WITNESSES:
Frank S. Obin
James Oppenheim

INVENTORS
George T. Hanchett
Frederick B. Sage
BY
W. A. Rosenbaum
ATTORNEY

THE NORRIS PETERS CO., PHOTO-LITHO., WASHINGTON, D. C.

UNITED STATES PATENT OFFICE.

GEORGE T. HANCHETT AND FREDERICK B. SAGE, OF HACKENSACK, NEW JERSEY.

ELECTRICAL MEASURING INSTRUMENT.

SPECIFICATION forming part of Letters Patent No. 617,418, dated January 10, 1899.

Application filed May 2, 1898. Serial No. 679,476. (No model.)

*To all whom it may concern:*

Be it known that we, GEORGE T. HANCHETT and FREDERICK B. SAGE, citizens of the United States, residing at Hackensack, in the county of Bergen and State of New Jersey, have invented certain new and useful Improvements in Electrical Measuring Instruments, of which the following is a full, clear, and exact description.

This invention relates to electrical measuring instruments, and has special reference to the Wheatstone bridge of the "slide-wire" type.

The object of the invention is to provide a simple form of instrument which shall be cheap to construct, sufficiently accurate for all practical purposes, and in which the operation of measuring resistances is made very simple.

Incidentally, in carrying out our invention we have devised a scale which indicates directly the number of ohms in the measured resistance, and thereby eliminates the necessity of performing calculations after a balance is obtained.

The principal features of our invention are its compactness and the simplicity with which measurements may be made.

Figure 1:
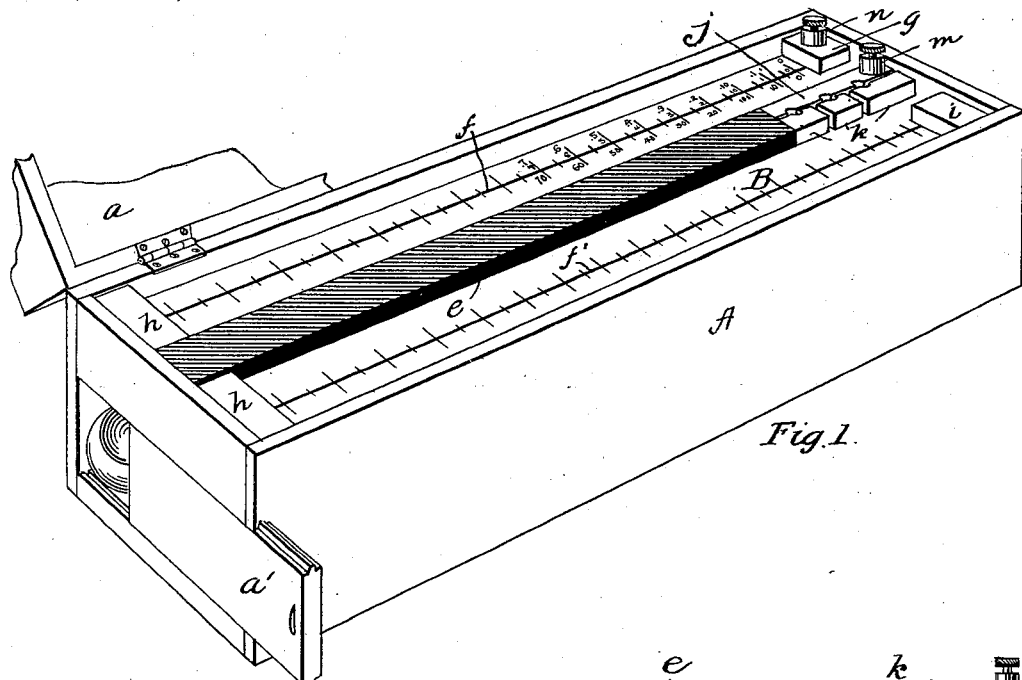
Figure 2:
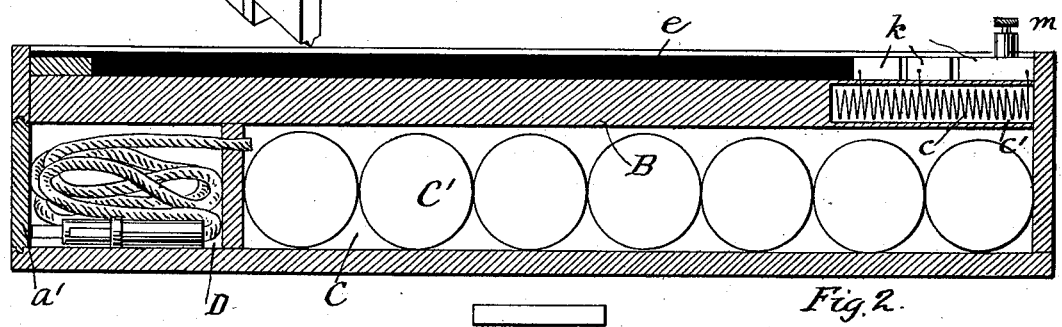
Figure 3:
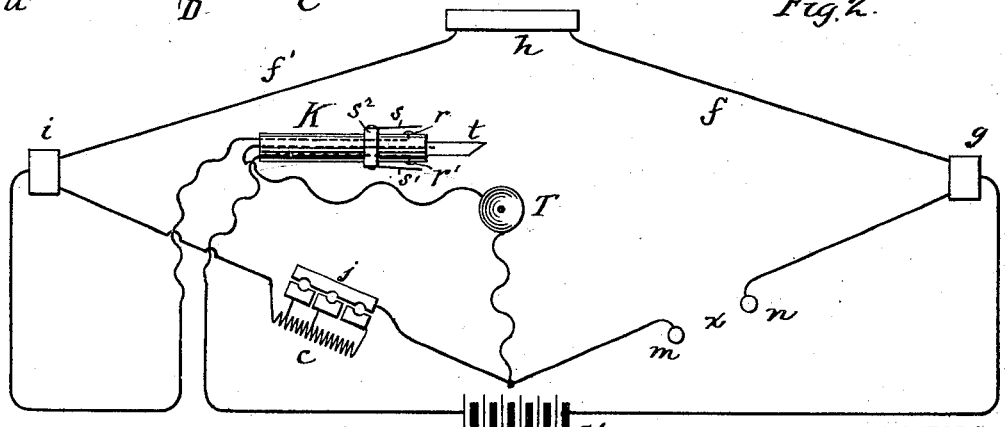

In the accompanying drawings, Figure 1 is a perspective view of the apparatus. Fig. 2 is a sectional view of the same. Fig. 3 is a diagram of the circuits.

The apparatus, as usual, is contained in a suitable box A, having a cover $a$. The cover being opened discloses a face-board B, and beneath this the box is divided into two compartments C and D, respectively, the former containing a battery $C'$ and the latter serving as a housing for a telephone-receiver, a circuit-closer, and flexible conductors, to which they are connected. For the removal of these devices the box A has a slide-door $a'$ opening into the compartment. The flexible cord referred to passes through an opening in the partition between the two compartments and thence leads to the proper points for establishing the circuits hereinafter described. The resistance-wire commonly used with these instruments and termed the "known resistance" is a small coil of fine wire $c$, deposited in a cylindrical chamber $c'$, formed in the face-board B. Along the middle of the face-board is a strip $e$, upon which the operator may rest his hand while testing. On each side and parallel to this is stretched a high-resistance wire $ff'$. Wire $f$ is stretched from copper block $g$ to the copper cross-bar $h$, and wire $f'$ is stretched from the cross-bar $h$ to the copper block $i$, a continuous circuit thus being formed from block $g$ through the wire $f$, bar $h$, and wire $f'$ to block $i$. At one end of the face-board, preferably in line with the strip $e$, is fixed a copper bar $j$, and opposite to it a plurality of copper blocks $k$, with sockets between the bar and blocks for connecting them by means of a plug. Two binding-posts $m$ and $n$ are provided, between which the circuit or resistance to be measured is to be connected. One of these posts connects with the block $g$, while the other connects with the bar $j$.

The telephone instrument and circuit-closer above referred to are indicated by T and K, respectively. The circuit-closer consists of a handle of insulating material having a metallic point or "toucher" $t$ at its extremity and two circuit-terminals $r$ and $r'$, respectively, which may be electrically connected together by two metallic springs $s$ and $s'$, attached to a metallic collar $s^2$.

The circuits are as follows: The battery $C'$ is connected between the blocks $g$ and $i$, its circuit being normally open between the points $r$ and $r'$ on the circuit-closer K, but closed when the operator presses the springs $s$ and $s'$ against $r$ and $r'$. From block $g$ wires $f$ and $f'$ extend to block $i$, forming two arms of the bridge, the other two arms being formed, respectively, by the known resistance $c$ and the unknown resistance $x$ between the points $m$ and $n$. The bridge-circuit extends from a point between the resistances $c$ and $x$ through the telephone-receiver T and through K to the toucher $t$.

To measure a resistance or make a test, the unknown resistance or circuit is connected between the binding-posts $m$ and $n$. Then with the telephone at the ear and the circuit-closer K in hand the operator while pressing the springs $s$ and $s'$ against contacts $r$ $r'$ touches the wire $f$ or the wire $f'$ at different points until he finds a point where the touching is not accompanied by a sound from the telephone. This is an indication of a balance of resistances between the two sides of the bridge, and since the resistance of $f$, $f'$, and $c$ are known the value of $x$ may be determined therefrom by the usual formula; but when using the special scale we have devised the position of the toucher on the wire $f$ or $f'$ indicates at once the resistance of $x$ in ohms.

The object of the plurality of plugs $k$ and the bar $j$ is to enable the operator to alter one of the known resistances, so that it shall not be too high or too low for the unknown resistance. The three divisions shown provide for the use of one ohm, ten ohms, or one hundred ohms. We are obviously not limited to any particular subdivision of this resistance; but whatever number of subdivisions is provided for a corresponding number of scale-values must be provided. Thus three sets of figures are shown on the scale—one for one ohm of known resistance, another for ten ohms of known resistance, and the third for one hundred ohms of known resistance.

It is obvious that any other suitable form of indicating instrument may be substituted for the telephone.

Having described our invention, we claim—

1. In a Wheatstone bridge, the combination of the circuits thereof, a circuit-closer for the battery and a circuit-closer for the bridge both attached to a single movable handle, as and for the purpose set forth.

2. In a Wheatstone bridge of the "slide-wire" type, the combination with the high-resistance stretched wire forming one side of the circuit, a battery, a "toucher" and battery-circuit closer mounted together and movable, and an indicator in circuit with the "toucher," substantially as described.

3. In a Wheatstone bridge, the combination of two metallic blocks or terminals, insulated from each other, a metallic bar and two wires stretched between the respective blocks and the bar, said wires forming in series one side of the bridge-circuit, a movable "toucher" and an indicating instrument in circuit therewith, substantially as described.

4. In a Wheatstone bridge, the combination with the circuits thereof, of a bridge-circuit closer, and a battery-circuit closer, combined into a single movable device, substantially as described.

In witness whereof we subscribe our signatures in presence of two witnesses.

GEORGE T. HANCHETT.
FREDERICK B. SAGE.

Witnesses:
WM. A. ROSENBAUM,
JAMES OPPENHEIM.